United States Patent
Lewis et al.

(10) Patent No.: US 9,344,543 B2
(45) Date of Patent: May 17, 2016

(54) UTILIZING TELECOIL COMPATIBILITY ON A MOBILE DEVICE FOR IMPROVING FREQUENCY RANGE OF MULTIMEDIA PLAYBACK

(71) Applicant: Wistron Corporation, New Taipei (TW)

(72) Inventors: Ian Lewis, Rolling Meadows, IL (US); Michael Burke, Rolling Meadows, IL (US)

(73) Assignee: Wistron Corporation, New Taipei (TW)

( * ) Notice: Subject to any disclaimer, the term of this patent is extended or adjusted under 35 U.S.C. 154(b) by 10 days.

(21) Appl. No.: 14/332,072

(22) Filed: Jul. 15, 2014

(65) Prior Publication Data

US 2016/0021229 A1    Jan. 21, 2016

(51) Int. Cl.
  *H04R 25/00* (2006.01)
  *H04M 1/60* (2006.01)
  *H04M 1/725* (2006.01)

(52) U.S. Cl.
  CPC .......... *H04M 1/6033* (2013.01); *H04M 1/7253* (2013.01); *H04M 1/72591* (2013.01); *H04R 25/554* (2013.01); *H04R 25/43* (2013.01); *H04R 25/50* (2013.01); *H04R 25/505* (2013.01)

(58) Field of Classification Search
  CPC ...... H04R 25/554; H04R 25/43; H04R 25/50; H04R 2499/11; H04R 2225/61; H04R 2420/07; H04M 1/72591; H04M 1/6033
  USPC ............................................. 379/52; 381/331
  See application file for complete search history.

(56) References Cited

U.S. PATENT DOCUMENTS

| | | | |
|---|---|---|---|
| 7,397,926 B1 | 7/2008 | Frerking | |
| 7,634,098 B2 | 12/2009 | Townsend et al. | |
| 7,881,456 B1* | 2/2011 | Russell | G06F 1/1632 379/374.01 |
| 8,254,990 B2* | 8/2012 | Hawker | H04M 1/72522 455/344 |
| 8,300,865 B2 | 10/2012 | Frerking et al. | |
| 8,462,968 B2 | 6/2013 | Drader | |
| 2002/0039428 A1* | 4/2002 | Svajda | H04R 25/554 381/331 |
| 2003/0152243 A1* | 8/2003 | Julstrom | H04R 25/43 381/315 |
| 2004/0014426 A1* | 1/2004 | Moore | H04R 3/14 455/70 |
| 2007/0087784 A1 | 4/2007 | Yamamoto et al. | |
| 2008/0130867 A1* | 6/2008 | Bowen | H04M 1/03 379/443 |
| 2012/0289218 A1 | 11/2012 | Hawker et al. | |
| 2013/0272555 A1* | 10/2013 | Dave | H04R 25/50 381/317 |
| 2015/0010173 A1* | 1/2015 | Bernal Castillo | H04R 17/00 381/162 |

FOREIGN PATENT DOCUMENTS

TW    200629952    8/2006

\* cited by examiner

*Primary Examiner* — Olumide T Ajibade Akonai
(74) *Attorney, Agent, or Firm* — Leydig, Voit & Mayer, Ltd.

(57) ABSTRACT

A system is providing for augmenting multimedia playback on a mobile device. The system includes the mobile device and an auxiliary loudspeaker device. The mobile device includes a telecoil transmitter and is configured to, in a multimedia mode, provide a multimedia audio signal to the telecoil transmitter for transmission to the auxiliary loudspeaker device. The auxiliary loudspeaker device includes a telecoil to receive the transmitted multimedia audio signal and plays a low frequency portion of multimedia audio content at a loudspeaker of the auxiliary loudspeaker device.

16 Claims, 8 Drawing Sheets

UTILIZING TELECOIL COMPATIBILITY ON A MOBILE DEVICE FOR IMPROVING FREQUENCY RANGE OF MULTIMEDIA PLAYBACK

BACKGROUND

Many mobile telephone devices are capable of playing back voice call content (e.g., in a telephone call) as well as multimedia content (e.g., including music or other audio files, video files, streaming audio, streaming video, video conferencing, etc.). Mobile devices typically include an earpiece and one or more loudspeakers, and are configured to operate in different audio delivery modes based on the operational context. For voice calls, mobile devices may either be operated in a handset mode where audio is delivered at a relatively low volume level over the earpiece (requiring the user of the mobile device to hold the earpiece up to his or her ear), or in a speakerphone mode where audio is delivered at a relatively high volume level over one or more loudspeakers (allowing the user to keep the mobile device away from his or her ears while still hearing the content of the voice call). For multimedia content (e.g., music files), audio is delivered using the one or more loudspeakers. Playback of voice call audio content or multimedia audio content may also be available through a headphone jack, which allows headphones or other external playback devices to be plugged into the mobile device.

Due to the size of mobile devices, the loudspeaker(s) used in such devices are typically limited to playing audio at frequencies within the range of approximately 1 kHz to 20 kHz, and would be very inefficient at or incapable of producing low frequency audio signals having frequencies less than approximately 1 kHz. Accordingly, frequencies lower than 1 kHz are conventionally filtered out by the mobile devices prior to playback at the loudspeaker(s) of the mobile device, so as to avoid excessive distortion to the audio content (and also to avoid potential damage to the loudspeaker(s)). However, filtering out frequencies lower than 1 kHz causes degradation in the quality of a multimedia audio signal, which may, for example, span the frequency range of approximately 20 Hz to 20 kHz.

SUMMARY

Embodiments of the invention provide systems and methods for improving the playback of multimedia audio content at a mobile device using the mobile device loudspeaker(s), wherein a low frequency portion of the multimedia audio content is played at an auxiliary loudspeaker device in communication with the mobile device. Because the mobile device loudspeaker(s) plays back the high frequency portion of the multimedia audio content (e.g., approximately in the 1 kHz to 20 kHz range), playing back the low frequency portion of the multimedia audio content (e.g., approximately in the 20 Hz to 1 kHz range) using the auxiliary loudspeaker device supplements the sound provided by the mobile device loudspeaker(s) and provides a richer, fuller multimedia audio experience to the user.

Particularly, in exemplary embodiments, the auxiliary loudspeaker device includes a telecoil, and a telecoil transmitter of the mobile device is utilized to send a multimedia audio signal to the auxiliary loudspeaker device. In alternative embodiments, the auxiliary loudspeaker device may use other types of interfaces as well, such as, for example, a universal serial bus (USB) connection, a headphone jack connection, radiofrequency receivers utilizing Bluetooth or NFC, a WiFi-compatible receiver, etc., to receive a low-frequency portion of multimedia audio content for playback of the low-frequency portion of the multimedia audio content at the auxiliary loudspeaker device.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
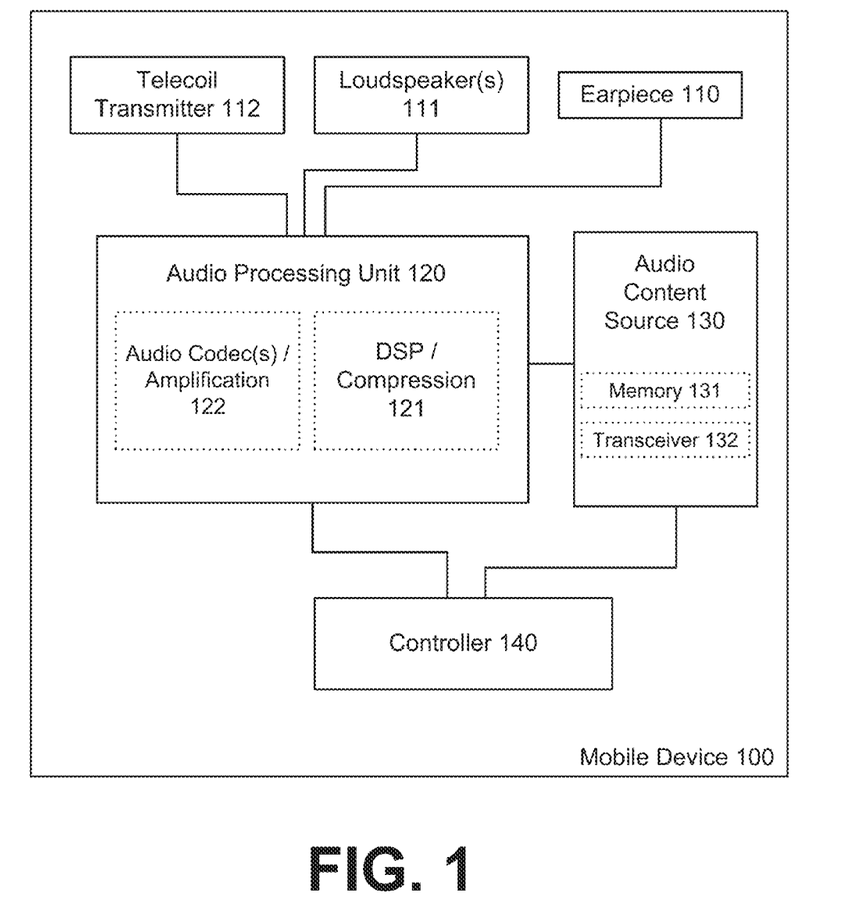
FIG. 1 is a block diagram illustrating components of a mobile device in an exemplary embodiment.

FIG. 1 illustrates certain components of an exemplary mobile device that is usable in certain exemplary embodiments of the invention. Mobile device 100 is a hearing-aid compatible (HAC) mobile telephone device, such as a smart phone, that includes various components, such as a touch-screen display, various input/output ports, a cellular antenna, a satellite-based navigation unit, etc., as may be found in conventional smartphones. For simplicity of depiction, only certain components of the mobile device 100, which relate to the discussion of the exemplary embodiments of the invention contained herein, are depicted in FIG. 1.

Figure 7:
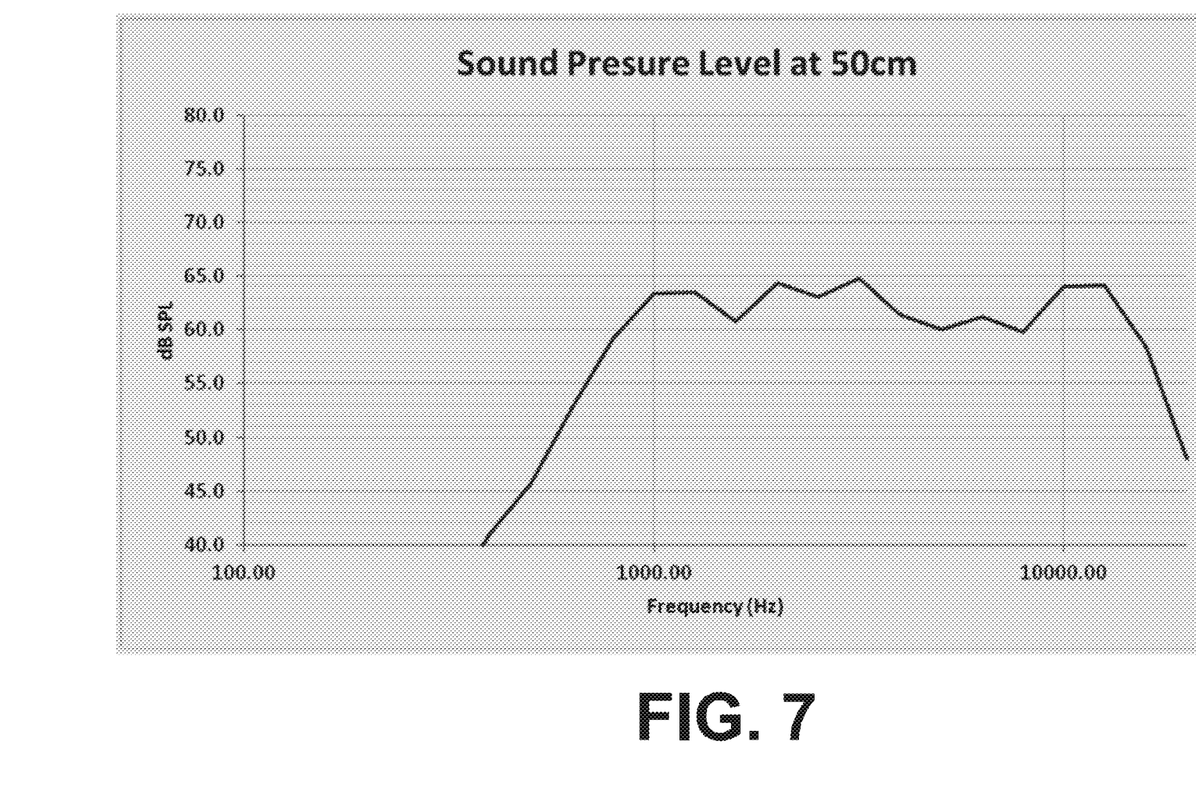
FIG. 7 is a graph illustrating sound pressure levels generated by an exemplary mobile device at a distance of 50 cm from the mobile device.

The mobile device 100 includes an earpiece 110, which is a speaker that is suitable for voice calls in a handset mode where the earpiece 110 is held next to a user's ear. The earpiece 110 is particularly suitable for producing audio in the range of the human voice (i.e., from approximately 200 Hz to 4 kHz) at relatively low volumes. The mobile device further includes one or two loudspeakers 111. The loudspeaker(s) 111 are suitable to provide audio output for voice calls in speakerphone mode where the mobile device 100 is held at a distance from the user's ears, as well as being suitable to provide multimedia audio output corresponding to multimedia content (such as playback of music files, video files, streaming music, streaming video, etc.). The loudspeaker(s) 111 are inefficient or incapable of producing relatively low frequency sounds (e.g., audio having frequency less than 1 kHz) at suitable volume levels for the situation where the mobile device is at a distance from the user's ears (e.g., around 50 cm). For example, FIG. 7 is an exemplary graph illustrating typical sound pressure levels generated by a mobile device at a distance of approximately 50 cm away from the mobile device. As can be seen in FIG. 7, the decibel level falls off at frequencies below approximately 1 kHz.

Because the mobile device 100 is hearing-aid compatible, the mobile device 100 further includes a telecoil transmitter 112. In an exemplary implementation, the telecoil transmitter 112 is a voice coil that is suitable for generating an electromagnetic audio signal corresponding to the audio content of a voice call. When a telecoil-compatibility feature of the mobile device 100 is active, the mobile device 100 is able to provide voice call services to a user having a telecoil-compatible hearing aid. A telecoil of the user's hearing aid receives an electromagnetic audio signal generated by the telecoil transmitter 112, which carries a voice call audio signal corresponding to the voice call, and produces a corresponding voice call audio output at a speaker of the hearing aid.

In certain alternative embodiments (not depicted in FIG. 1), the earpiece 110 itself acts as the telecoil transmitter 112. In such alternative embodiments, an electromagnetic field generated by the earpiece 110 is picked up by the hearing aid's telecoil, and a corresponding audio output is generated at the hearing aid's speaker.

The mobile device 100 further includes an audio processing unit 120, which includes audio codec(s) and/or amplifiers 122, as well as digital signal processors 121 for signal processing and compression. Audio signals from an audio content source 130 of the mobile device 100 are sent to the audio processing unit 120 and appropriately pre-processed for output via the earpiece 110, loudspeaker(s) 111, and/or telecoil transmitter 112. The audio content sources 130 include, for example, a memory 131 (which may have music files, voice files, video files, etc. stored thereon, and which may be a part of the mobile device 100 or an external memory in communication with the mobile device 100) and a transceiver 132 of the mobile device 100 (which may include, for example, a cellular communications interface or wireless internet communications interface that receives streaming music, video, and/or voice call content).

A controller 140, including one or more processors, interacts with processor-executable instructions stored at a non-transitory processor-readable medium of the mobile device 100 to control the operation of the audio processing unit 120 in connection with audio content sources 130. For example, when a voice call is being conducted by the mobile device 100 in handset mode, the controller 140 causes the audio processing unit 120 to utilize the earpiece 110 to provide audio output, at a relatively low volume, corresponding to a voice call signal received via the transceiver 132. When the user of the mobile device 100 provides an input (such as tapping an appropriate button) to switch the mobile device 100 into speakerphone mode, the audio output corresponding to the voice call content of the received voice call signal may then be provided via the loudspeaker(s) 111 rather than the earpiece 110. In another example, when the user instructs the mobile device 100 to play multimedia content such as a music file or a video file from the mobile device memory 131 (or to stream music content or video content via transceiver 132), the controller 140 causes the audio processing unit 120 to utilize the loudspeaker(s) 111 to provide audio output corresponding to the multimedia content, at a relatively high volume. In yet another example, when a voice call is being conducted by the mobile device 100 in a telecoil-compatible mode, the controller 140 causes the audio processing unit 120 to utilize the telecoil transmitter 112 to transmit an electromagnetic signal carrying the voice call content to a hearing aid of the user, which includes a telecoil for receiving the electromagnetic signal.

In each situation, the audio processing unit 120 appropriately performs pre-processing (e.g., including, for example, compression, format conversion, and amplification) of an audio signal received from the audio content source 130. For example, for multimedia audio content that is to be played back by the loudspeaker(s) 111, a digital signal processor 121 of the audio processing unit 120 applies a filter (e.g., a high-pass or band-pass filter) to the multimedia audio content such that a multimedia audio signal having frequencies only in the range from approximately 1 kHz to 20 kHz is sent to the loudspeaker(s) 111 for playback (i.e., the frequencies lower than 1 kHz are removed). Pre-processing performed by the audio processing unit 120 in voice mode typically includes, for example, identifying the coding scheme of the signal, decoding that audio signal, dynamic range conditioning using compression and/or expansion, frequency response shaping using Infinite Impulse Response or Finite Impulse Response filters, noise suppression, echo control and routing the signal to the appropriate transducer. Similar processing steps are used in a hearing aid-compatible mode.

While conventional mobile devices use the telecoil transmitter 112 only in voice call modes when a telecoil-compatibility feature is activated, exemplary embodiments of the present invention further utilize the telecoil transmitter 112 to transmit a multimedia signal to an auxiliary loudspeaker device, so as to allow the auxiliary loudspeaker device to play the relatively low frequency portions of multimedia audio content that is unable to be played by the loudspeaker(s) 111. In one exemplary implementation, the relatively low frequency portion of the source multimedia audio content is separated out by the audio processing unit 120 (e.g., by using a band-pass or low-pass filter), and only that low frequency portion is transmitted by the telecoil transmitter 112 to the auxiliary loudspeaker device for playback by a loudspeaker of the auxiliary loudspeaker device suitable for playback of such low frequency audio at appropriately high volume levels. In another exemplary implementation, the entirety of the source multimedia audio content is transmitted using the telecoil transmitter 112 to the auxiliary loudspeaker device, and the auxiliary loudspeaker device separates out the relatively low frequency portion for playback at its loudspeaker. It will be appreciated that these principles relating to multimedia audio content are also applicable to playback of a voice call in speakerphone mode—i.e., using the auxiliary loudspeaker device to play back the relatively low frequency audio portion of the voice call content.

Figure 2A:
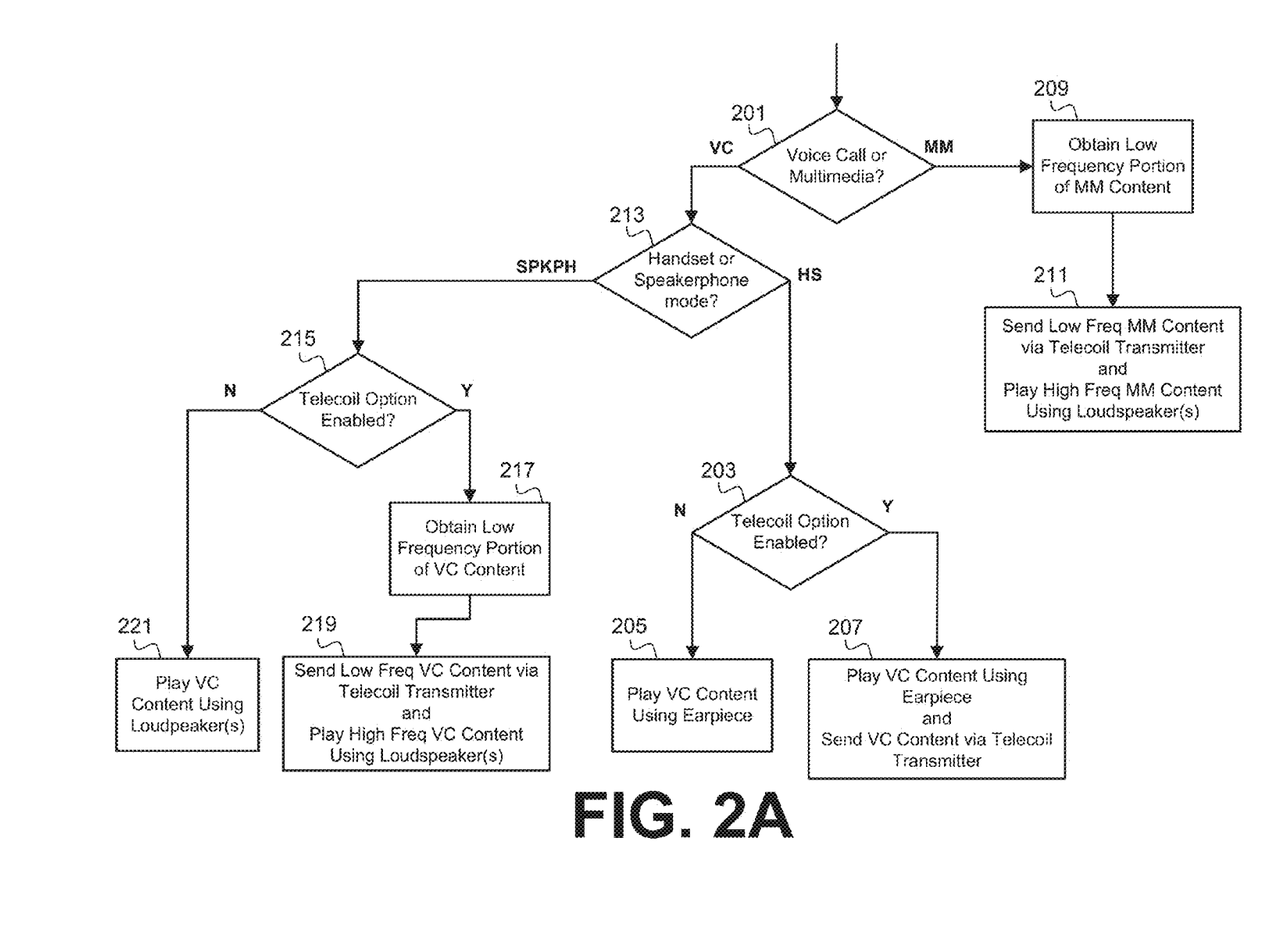
FIGS. 2A and 2B are flowcharts illustrating different modes of operation of the mobile device in exemplary embodiments.
Figure 2B:
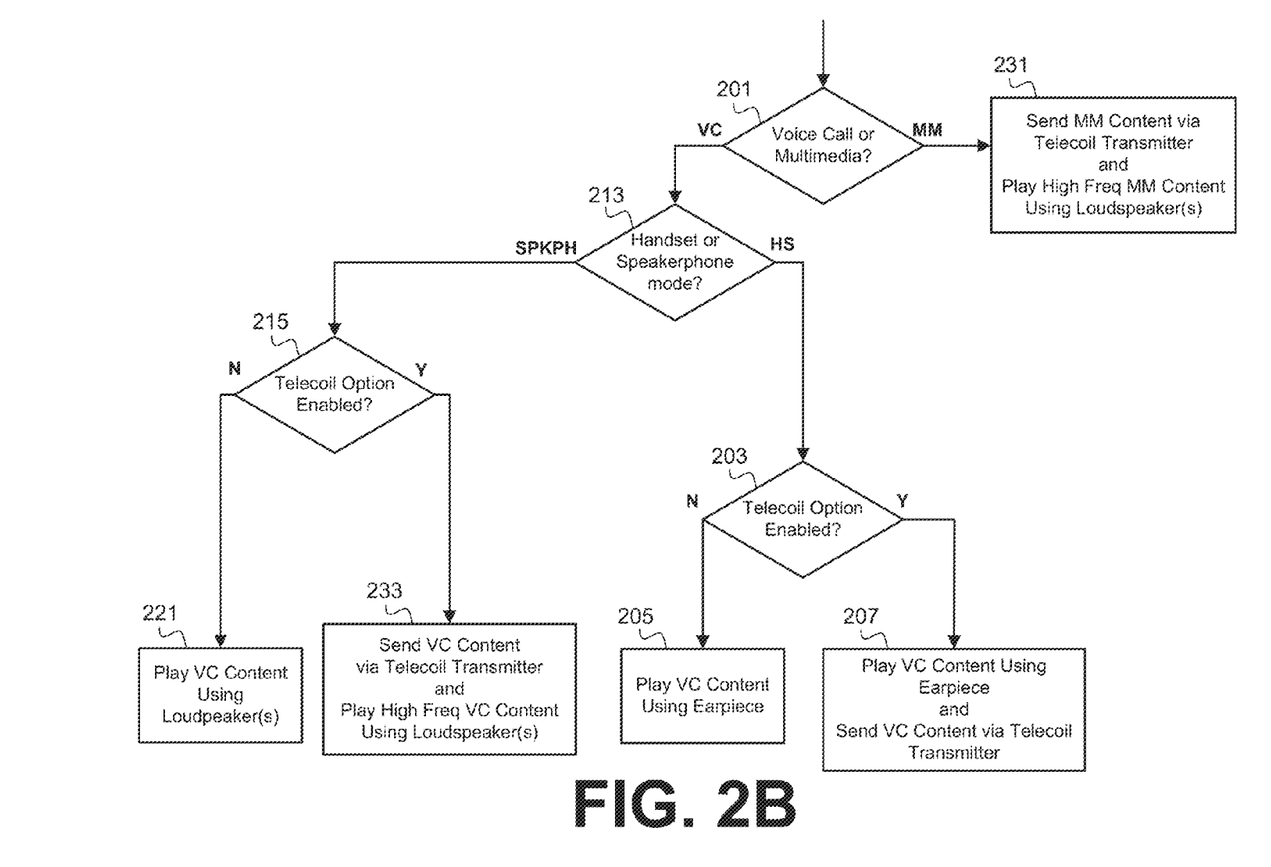

These exemplary implementations of the invention are illustrated in FIGS. 2A and 2B. FIG. 2A is a flowchart illustrating different modes of operation of the mobile device based on different operating conditions. At stage 201, the mobile device determines whether voice call audio content or multimedia audio content is to be played, and if voice call audio content is to be played, the mobile device further determines whether a telecoil-compatibility feature of the mobile device is enabled (at stage 203 for handset mode or at stage 215 for speakerphone mode, pursuant to a determination of whether the voice call is to be handled in speakerphone mode or handset mode at stage 213). If the telecoil option is not enabled, the voice call audio content is played using the mobile device's earpiece (at stage 205 in handset mode) or by one or more of the loudspeakers (at stage 221 in speakerphone mode). If the telecoil option is enabled and the mobile device is in handset mode, the voice call audio content is played via the earpiece and via a hearing aid by sending a voice call audio signal corresponding to the voice call audio content to a telecoil of the hearing aid via the telecoil transmitter of the mobile device (stage 207). If the telecoil option is enabled and the mobile device is in speakerphone mode, the mobile device obtains a low frequency portion of the voice call audio content at stage 217 (e.g., via a band-pass or low-pass filter), and sends a voice call audio signal corresponding to the low frequency portion of the voice call audio content to the telecoil transmitter for transmission at stage 219 (such that an auxiliary loudspeaker device is able to receive the low frequency portion of the voice call audio content and play it back in combination with the mobile device loudspeakers playing back a relatively higher frequency portion of the voice call audio content).

On the other hand, if the mobile device determined that multimedia audio content is to be played at stage 201, the mobile device obtains a low frequency portion of the multimedia audio content at stage 209 (e.g., via a band-pass or low-pass filter), and sends a multimedia audio signal corresponding to the low frequency portion of the multimedia audio content to the telecoil transmitter for transmission at stage 211 (such that an auxiliary loudspeaker device is able to receive the low frequency portion of the multimedia audio content and play it back in combination with the mobile device loudspeakers playing back a relatively higher frequency portion of the multimedia audio content).

FIG. 2B is similar to FIG. 2A, except that in FIG. 2B, in multimedia mode and in voice call mode with speakerphone mode, the mobile device sends a multimedia audio signal or a voice call audio signal corresponding to the entire frequency spectrum of the multimedia audio content or the voice call audio content, respectively, to the telecoil transmitter for transmission (at stage 231 for multimedia mode and at stage 233 in voice call mode with speakerphone mode). In the implementation depicted in FIG. 2B, the auxiliary loudspeaker device having the telecoil, to which the multimedia audio signal or voice call audio signal is sent, is responsible for applying a band-pass or low-pass filter to the multimedia audio signal or voice call audio signal to obtain the low frequency portion of the multimedia audio content or the voice call audio content, respectively, for playback at the auxiliary loudspeaker device.

It will be appreciated that the modes of operation shown in FIGS. 2A and 2B apply to situations where the mobile device is not operating in a headphones (or other auxiliary device) mode. In such circumstances, audio signals may be sent out via a headphone jack to be played by headphones (or another auxiliary device) in lieu of being played at the mobile device loudspeaker(s) or earpiece. It will further be appreciated that the modes of operation shown in FIGS. 2A and 2B assume that an auxiliary loudspeaker device having a telecoil is available for playback of multimedia audio content. In certain exemplary implementations, a multimedia audio signal (whether it includes only a low frequency portion of the multimedia audio content or the entire spectrum of the multimedia audio content) is always sent to the telecoil transmitter and transmitted out regardless of whether an auxiliary loudspeaker device having a telecoil is available. In other exemplary implementations, the mobile device may first determine that an auxiliary loudspeaker device having a telecoil is available before making the transmission.

Figure 3:
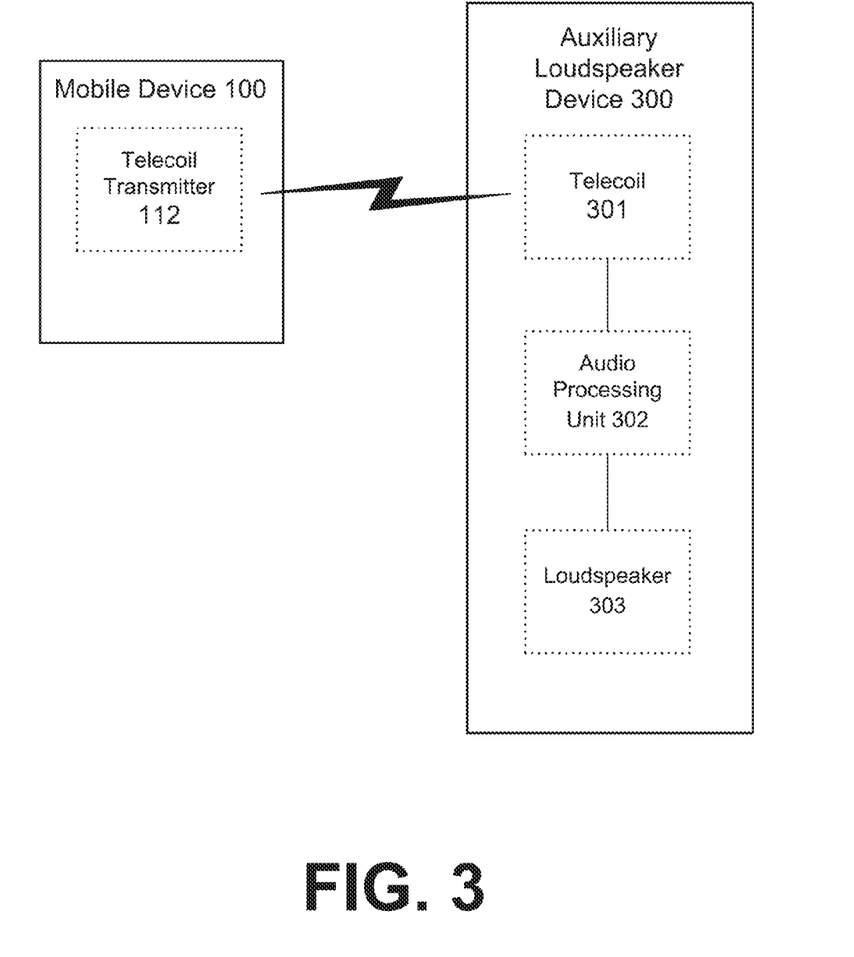
FIG. 3 is a block diagram illustrating components of an auxiliary loudspeaker device in an exemplary embodiment.

FIG. 3 is a block diagram illustrating components of an auxiliary loudspeaker device 300 in an exemplary embodiment. The auxiliary loudspeaker device 300 includes a telecoil 301, which is adapted to receive audio signals from the telecoil transmitter 112 of the mobile device 100. The telecoil 301 is appropriately positioned within the housing of the auxiliary loudspeaker device 300 such that when the mobile device 100 is placed on, in, or adjacent to the auxiliary loudspeaker device 300, the telecoil transmitter 112 and the telecoil 301 are proximate to one another. For example, in implementations where the auxiliary loudspeaker device 300 is in the form a dock having a slot within which the mobile device 100 is to be placed, the telecoil 301 will be appropriately positioned in the housing of the auxiliary loudspeaker device 300 proximate to the slot such that placement of the mobile device 100 in the slot causes the telecoil 301 to align with the telecoil transmitter 112.

The auxiliary loudspeaker device 300 further includes an audio processing unit 302, which may include, for example, in the implementation where the auxiliary loudspeaker receives a multimedia audio signal corresponding to an entire frequency spectrum of the multimedia audio content, a preamplifier that amplifies the multimedia audio signal received via the telecoil 301, a shaping filter (e.g., a signal processing circuit including a low-pass or a band-pass filter) for obtaining a low frequency portion of the multimedia audio content of the received multimedia audio signal, and a power amplifier for amplifying the obtained low frequency portion of the multimedia audio content. In another example, with respect to the implementation where the multimedia audio signal received by the auxiliary loudspeaker device 300 corresponds to only the low frequency portion of the multimedia audio content, the audio processing unit 302 may include the power amplifier while omitting the preamplifier and shaping filter.

The auxiliary loudspeaker device 300 further includes a loudspeaker 303, which is contained within an enclosure, configured to receive the amplified low frequency portion of the multimedia audio content and play it out at a volume comparable to the volume provided by the mobile phone loudspeaker(s). For example, in an exemplary implementation, the auxiliary loudspeaker device 300 is configured to generate approximately 70 dB (SPL) in the frequency range of approximately 300 Hz to 1 kHz at a distance of approximately 50 cm from the loudspeaker 303.

Control of the auxiliary loudspeaker device 300 may be provided via inputs on the housing of the auxiliary loudspeaker device 300 or may be provided through wireless or wired communications with the mobile device 100 utilizing an appropriate communications interface (not depicted in FIG. 3). For example, in one implementation, a user may control the auxiliary loudspeaker device by using an on-off switch and/or a volume slider or dial on the auxiliary loudspeaker device 300 itself. In another implementation, a user may control the auxiliary loudspeaker device via the mobile device 100, for example, via a wireless connection (e.g., short-range wireless such as Bluetooth or NFC) or wired connection (e.g., a USB connection) to independently control the volume and/or on/off status of the auxiliary loudspeaker device 300. In another exemplary implementation, the volume of the auxiliary loudspeaker device 300 is automatically matched to the volume of the mobile device loudspeaker(s) by the mobile device's controller, for example, based on a volume control signal sent to the auxiliary loudspeaker device 300 via a wireless or wired connection to the mobile device.

Figure 4:
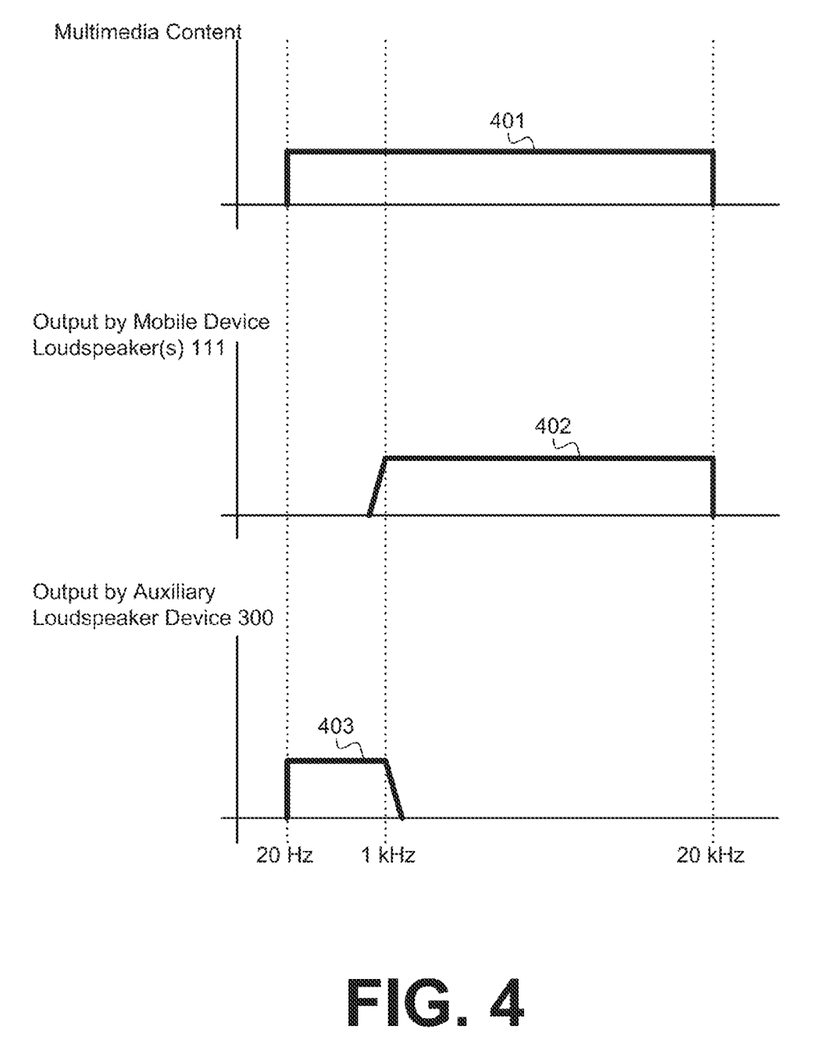
FIG. 4 is a graphical illustration of frequency ranges corresponding to multimedia audio content and the portions of the multimedia audio content played by the mobile device and the auxiliary loudspeaker device in an exemplary embodiment.

FIG. 4 provides an exemplary graph-based illustration of the frequency range of multimedia audio content, as well as the portions of the multimedia audio content that are played by the mobile device loudspeaker(s) versus the portions of the multimedia audio content that are played by the auxiliary loudspeaker device. In this exemplary illustration, the multimedia audio content spans a frequency spectrum ranging from 20 Hz to 20 kHz. The mobile device filters out a relatively higher-frequency portion of the multimedia audio content, i.e., from approximately 1 kHz to 20 kHz, and plays only that portion of the multimedia audio content at the mobile device loudspeaker(s). The auxiliary loudspeaker device 300 filters out or receives, pre-filtered, a relatively lower-frequency portion of the multimedia audio content, i.e., from approximately 20 Hz to 1 kHz, and plays only that portion of the multimedia audio content at the loudspeaker of the auxiliary loudspeaker device.

Exemplary embodiments of the invention discussed above with respect to FIGS. 1-3 are related to using the telecoil transmitter of a mobile device to transmit a multimedia audio signal (whether the signal corresponds to the full spectrum of multimedia audio content or a low-frequency portion of multimedia audio content) to an auxiliary loudspeaker device for playback of a low-frequency portion of multimedia audio content corresponding to the multimedia audio signal at the auxiliary loudspeaker device. These exemplary embodiments provide for advantageous use of the telecoil transmitter of a mobile device during the playback of multimedia audio content by the mobile device, so as to enhance the user experience by providing playback of frequency ranges unplayable by the mobile device loudspeaker(s).

Figure 5:
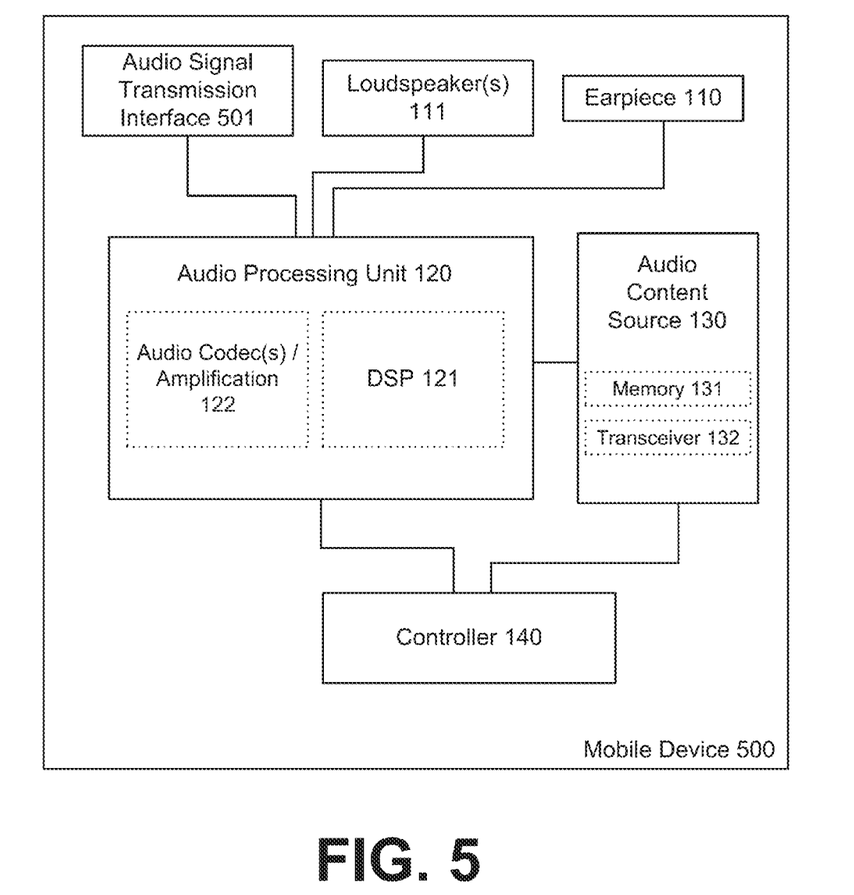
FIG. 5 is a block diagram illustrating components of a mobile device in an alternative exemplary embodiment.
Figure 6:
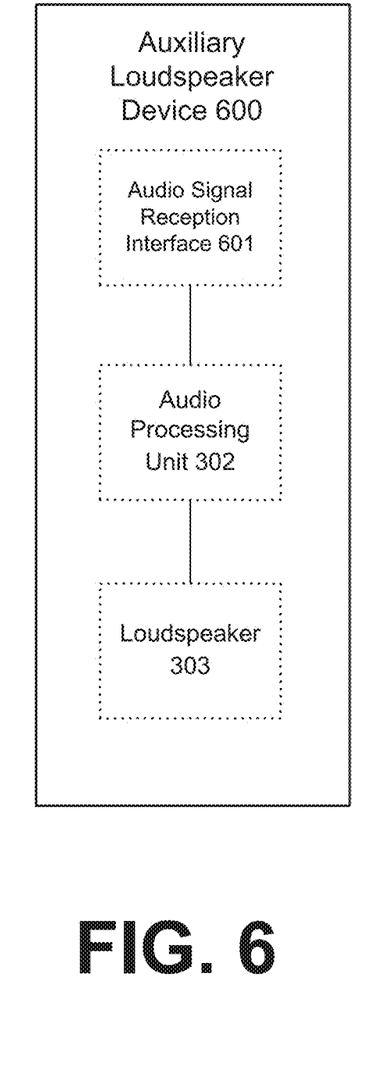
FIG. 6 is a block diagram illustrating components of an auxiliary loudspeaker device in an alternative exemplary embodiment.

Further exemplary embodiments of the invention are depicted in FIGS. 5-6 that utilize various types of communication protocols for providing playback of relatively low-frequency audio at an auxiliary loudspeaker device. The mobile device 500 depicted in FIG. 5 is similar to the mobile device 100 in FIG. 1, except that the telecoil transmitter 112 of mobile device 100 is substituted with a more general audio signal transmission interface 501 in mobile device 500. The auxiliary mobile device 600 depicted in FIG. 6 is similar to the auxiliary device 300 in FIG. 3, except that the telecoil 301 is substituted with a more general audio signal reception interface 601 in the auxiliary loudspeaker device 600.

In the embodiments of the invention depicted in FIGS. 5-6, the mobile device 500 obtains the low-frequency portion of the multimedia audio content and sends only that low-frequency portion of the multimedia audio content as a multimedia audio signal to the auxiliary loudspeaker device 600 via the audio signal transmission interface 501 of the mobile device 500 and the audio signal reception interface 601 of the auxiliary loudspeaker device 600. Examples of the audio signal transmission interface 501 include a universal serial bus (USB) interface (e.g., a USB socket), a headphone (or other audio output device) jack, a radiofrequency transmitter (e.g., utilizing Bluetooth or NFC), a wireless or wired internet connection interface (e.g., a WiFi-compatible transceiver or an Ethernet socket), or a telecoil transmitter, with a corresponding audio signal reception interface 601 at the auxiliary loudspeaker device 600—e.g., a USB interface (e.g., a USB socket or a USB connector/cable), a headphone (or other audio output device) jack or a headphone (or other audio output device) connector/cable, a radiofrequency receiver, a wireless or wired internet connection interface, or a telecoil. In certain embodiments, a transceiver 132 acting as a source of multimedia audio content may overlap with the audio signal transmission interface 501 (for example, when streaming audio from the Internet via a wireless internet interface of the mobile device, and using that wireless internet interface also to transmit the low-frequency portion of the streaming audio to the auxiliary loudspeaker device).

It will be appreciated that, when the present application uses the word "only" in the contexts of, for example, "only" the low frequency portion of multimedia content being played by the auxiliary loudspeaker device or being transmitted to the auxiliary loudspeaker device, and "only" the high frequency portion of multimedia content being played by the mobile device loudspeaker(s), the word "only" is being used with reference to the multimedia audio content. Thus, for example, the statement that the mobile device loudspeaker(s) plays "only" the high frequency portion of the multimedia audio content means that, when the mobile device is being used to play the multimedia audio content, the mobile device loudspeaker(s) plays the high frequency portion of the multimedia audio content but not the low frequency portion of the multimedia audio content. The mobile device loudspeaker(s) may still play other content in other contexts of operation (e.g., playing voice call audio content in speakerphone mode, or playing other sounds such as ringtones and message alert sounds). Similarly, for example, the statement that the mobile device transmits "only" the low frequency portion of the multimedia audio content to the auxiliary loudspeaker device means that the low frequency portion of the multimedia audio content is transmitted but not the high frequency portion of the multimedia audio content. The mobile device may still transmit other content apart from the multimedia audio content to the auxiliary loudspeaker device (e.g., control signals).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for augmenting multimedia playback on a mobile device, comprising:
   the mobile device, comprising a telecoil transmitter configured to generate an electromagnetic field carrying an audio signal, the mobile device being configured to be operated in a hearing-aid compatible (HAC) voice call mode and a multimedia mode, wherein an audio processing unit of the mobile device is configured to, in the HAC voice call mode, provide a voice call audio signal to the telecoil transmitter for transmission to a hearing aid device and configured to, in the multimedia mode, provide a low frequency portion of a multimedia audio signal to the telecoil transmitter for transmission to an auxiliary loudspeaker device, wherein the multimedia audio signal is based on multimedia audio content to be played in part by the mobile device; and
   the auxiliary loudspeaker device, comprising a telecoil and a loudspeaker, configured to receive the multimedia audio signal via the telecoil and to play the low frequency portion of the multimedia audio content.

2. The system according to claim 1, wherein the audio processing unit of the mobile device is further configured to apply a filter to the multimedia audio content to obtain the low frequency portion of the multimedia audio content.

3. The system according to claim 1, wherein the multimedia audio signal transmitted to the auxiliary loudspeaker device includes both the low frequency portion of the multimedia audio content and a high frequency portion of the multimedia audio content; and
   wherein the auxiliary loudspeaker device is configured to apply a filter to the multimedia audio content of the transmitted multimedia audio signal for playing the low frequency portion of the multimedia audio content.

4. The system according to claim 1, wherein in the multimedia mode, the audio processing unit of the mobile device is configured to apply a filter to the multimedia audio content to obtain a high frequency portion of the multimedia content; and
   wherein the mobile device further comprises a loudspeaker and the mobile device is configured to utilize the loudspeaker to play the high frequency portion of the multimedia audio content.

5. The system according to claim 4, wherein the mobile device comprises two loudspeakers and the mobile device is configured to utilize both loudspeakers to play the high frequency portion of the content of the audio source.

6. The system according to claim 4, wherein the high frequency portion of the multimedia content consists of audio having frequencies higher than approximately 1 kHz.

7. The system according to claim 1, wherein the low frequency portion of the multimedia content consists of audio having frequencies lower than approximately 1 kHz.

8. An apparatus for operating in a hearing-aid compatible (HAC) voice call mode and a multimedia mode, comprising:
   a telecoil transmitter; and
   an audio processing unit configured to, in the HAC voice call mode, provide a voice call audio signal to the telecoil transmitter for transmission to a hearing aid device and configured to, in the multimedia mode, provide a low frequency portion of a multimedia audio signal to the telecoil transmitter for transmission to an auxiliary loudspeaker device, wherein the multimedia audio signal is based on multimedia audio content to be played.

9. The apparatus according to claim 8, wherein the audio processing unit is further configured to filter the multimedia audio content to obtain a low frequency portion of the multimedia audio content.

10. The apparatus according to claim 9, wherein the low frequency portion of the multimedia content consists of audio having frequencies lower than approximately 1 kHz.

11. The apparatus according to claim 8, wherein the audio processing unit is configured to filter the multimedia audio content to obtain a high frequency portion of the multimedia content.

12. The apparatus according to claim 11, wherein the apparatus further comprises a loudspeaker to play the high frequency portion of the multimedia content.

13. The apparatus according to claim 11, wherein the high frequency portion of the multimedia content consists of audio having frequencies higher than approximately 1 kHz.

14. An apparatus for operating in a multimedia mode, comprising:
   an audio processing unit configured to apply filters to obtain a low frequency portion and a high frequency portion of multimedia audio content to be played;
   a loudspeaker configured to play the high frequency portion of the multimedia audio content; and
   an audio signal transmission interface configured to transmit the low frequency portion of the multimedia audio content to an auxiliary loudspeaker device having an audio signal reception interface corresponding to the audio signal transmission interface, wherein the audio signal transmission interface is a telecoil transmitter.

15. A system for augmenting multimedia playback on a mobile device, comprising:
   the mobile device, comprising an audio signal transmission interface and an audio processing unit, wherein the audio processing unit is configured to apply filters to obtain a low frequency portion and a high frequency portion of multimedia audio content to be played in part by the mobile device, wherein the mobile device is configured to play the high frequency portion of the multimedia audio content via a loudspeaker of the mobile device and to transmit the low frequency portion of the multimedia audio content via the audio signal transmission interface to an auxiliary loudspeaker device; and
   the auxiliary loudspeaker device, comprising an audio signal reception interface and a loudspeaker, the auxiliary loudspeaker device being configured to receive the low frequency portion of the multimedia audio content via the audio signal reception interface and to play the low frequency portion of the multimedia audio content via the loudspeaker of the of the auxiliary loudspeaker device;
   wherein the audio signal transmission interface of the mobile device is a telecoil transmitter and the audio signal reception interface of the auxiliary loudspeaker device is a telecoil.

16. The system according to claim 15, wherein the high frequency portion of the multimedia content consists of audio having frequencies higher than approximately 1 kHz; and
   wherein the low frequency portion of the multimedia content consists of audio having frequencies lower than approximately 1 kHz.

* * * * *